United States Patent
Kinoshita et al.

(10) Patent No.: US 9,606,812 B2
(45) Date of Patent: Mar. 28, 2017

(54) ELECTRONIC APPARATUS, NON-TRANSITORY COMPUTER READABLE MEDIUM, AND INFORMATION PROCESSING METHOD

(71) Applicant: FUJI XEROX CO., LTD., Tokyo (JP)

(72) Inventors: Yosuke Kinoshita, Kanagawa (JP); Yasushi Amano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 218 days.

(21) Appl. No.: 14/523,163

(22) Filed: Oct. 24, 2014

(65) Prior Publication Data

US 2015/0355910 A1  Dec. 10, 2015

(30) Foreign Application Priority Data

Jun. 10, 2014 (JP) ................................ 2014-119520

(51) Int. Cl.
| | |
|---|---|
| *G06F 1/24* | (2006.01) |
| *G06F 9/00* | (2006.01) |
| *G06F 9/44* | (2006.01) |
| *G06F 13/24* | (2006.01) |
| *G06F 11/14* | (2006.01) |

(52) U.S. Cl.
CPC .......... *G06F 9/441* (2013.01); *G06F 11/1417* (2013.01); *G06F 13/24* (2013.01)

(58) Field of Classification Search
CPC ......... G06F 9/4411; G06F 9/4401; G06F 1/24
See application file for complete search history.

(56) References Cited

U.S. PATENT DOCUMENTS

| | | | |
|---|---|---|---|
| 6,675,295 B1* | 1/2004 | Marcelais | G06F 11/1441 713/1 |
| 2002/0083316 A1* | 6/2002 | Platenberg | G06F 9/4416 713/2 |
| 2005/0083749 A1* | 4/2005 | Keohane | G06F 8/61 365/222 |
| 2008/0082814 A1* | 4/2008 | Kuo | G06F 11/1417 713/2 |
| 2008/0133968 A1* | 6/2008 | Muppirala | G06F 11/0778 714/13 |
| 2008/0141016 A1* | 6/2008 | Chang | G06F 11/1433 713/2 |
| 2008/0270782 A1* | 10/2008 | Bone | H04L 67/14 713/2 |
| 2010/0122075 A1* | 5/2010 | Chen | G06F 9/4416 713/2 |
| 2012/0210110 A1 | 8/2012 | Akiyoshi | |

(Continued)

FOREIGN PATENT DOCUMENTS

JP   2012-185800 A   9/2012

*Primary Examiner* — Phil Nguyen
(74) *Attorney, Agent, or Firm* — Oliff PLC

(57) ABSTRACT

An electronic apparatus includes a first boot unit and a boot management unit. The first boot unit performs a first boot process for booting a first program. The boot management unit performs control of the first boot unit so as not to boot the first program in the first boot process next time when an interruption of the first boot process occurs and the interruption is caused by the first program being booted. The boot management unit does not perform the control when the interruption is caused by a factor other than the first program.

13 Claims, 7 Drawing Sheets

(56) References Cited

U.S. PATENT DOCUMENTS

| | | | |
|---|---|---|---|
| 2013/0185549 A1* | 7/2013 | Hu | G06F 9/4401 713/2 |
| 2014/0173268 A1* | 6/2014 | Hashimoto | G06F 11/0754 713/2 |
| 2014/0201565 A1* | 7/2014 | Candea | G06F 11/079 714/6.2 |

* cited by examiner

FIG. 1
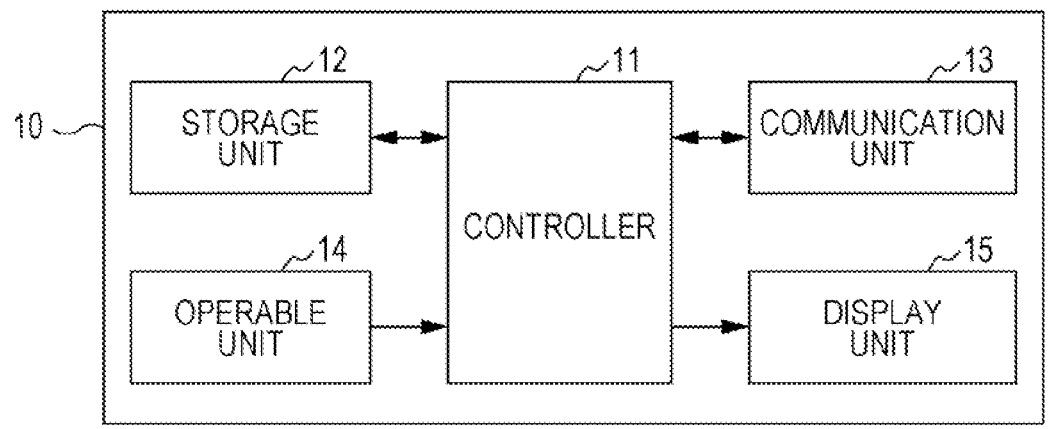
FIG. 2
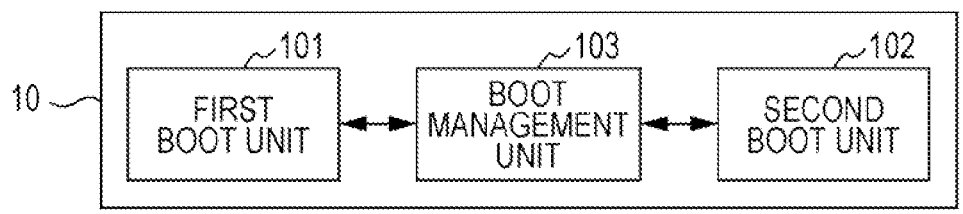
FIG. 3
| FIRST PROGRAM | FIRST BOOT STATUS | BOOT SETTING |
|---|---|---|
| Plugin-A | 1 (BOOTING) | 1 (BOOT) |
| Plugin-B | 0 (NON-BOOTING) | 1 (BOOT) |
FIG. 4A
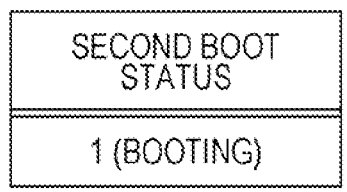
FIG. 4B
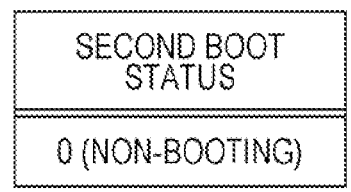

FIG. 9
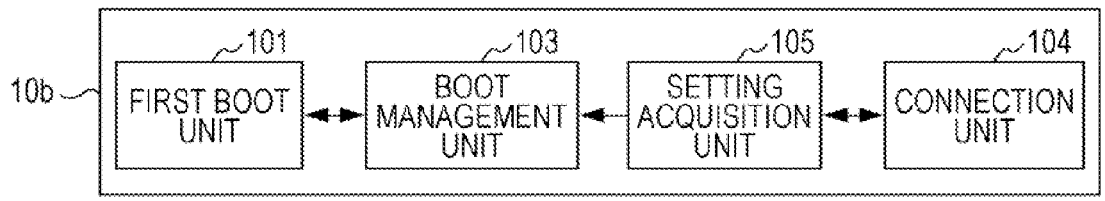
FIG. 10
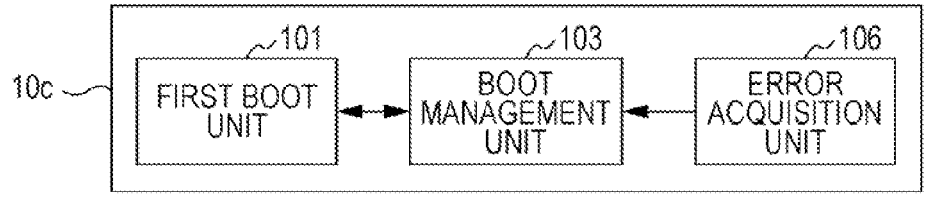
FIG. 11
| FIRST PROGRAM | BOOT STATUS | ERROR INFORMATION | BOOT SETTING |
|---|---|---|---|
| Plugin-A | 1 (BOOTING) | NULL | 1 (BOOT) |
| Plugin-B | 0 (NON-BOOTING) | NON-FATAL ERROR INFORMATION | 1 (BOOT) |
| Plugin-C | 0 (NON-BOOTING) | FATAL ERROR INFORMATION | 0 (STOP) |
FIG. 12
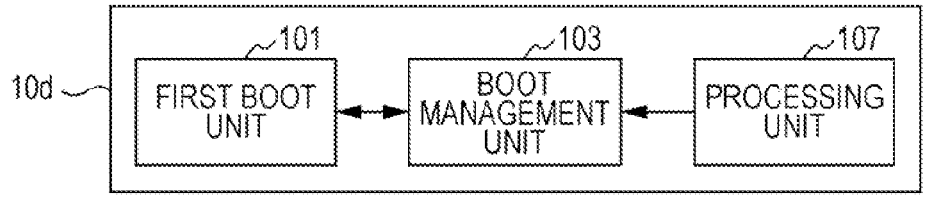

FIG. 13

| FIRST PROGRAM | BOOT STATUS | BOOT SETTING | NUMBER OF INTERRUPTIONS |
|---|---|---|---|
| Plugin-A | 1 (BOOTING) | 1 (BOOT) | 0 |
| Plugin-B | 0 (NON-BOOTING) | 1 (BOOT) | 1 |
| Plugin-C | 0 (NON-BOOTING) | 0 (STOP) | 4 |

FIG. 14A

| FIRST PROGRAM | FIRST BOOT STATUS | BOOT SETTING | BOOT SEQUENCE |
|---|---|---|---|
| Plugin-A | 0 (NON-BOOTING) | 1 (BOOT) | 1 |
| Plugin-B | 1 (BOOTING) | 1 (BOOT) | 2 |
| Plugin-C | 0 (NON-BOOTING) | 1 (BOOT) | 3 |

FIG. 14B

| FIRST PROGRAM | FIRST BOOT STATUS | BOOT SETTING | BOOT SEQUENCE |
|---|---|---|---|
| Plugin-A | 0 (NON-BOOTING) | 1 (BOOT) | 2 |
| Plugin-B | 0 (NON-BOOTING) | 1 (BOOT) | 1 |
| Plugin-C | 0 (NON-BOOTING) | 1 (BOOT) | 3 |

FIG. 15

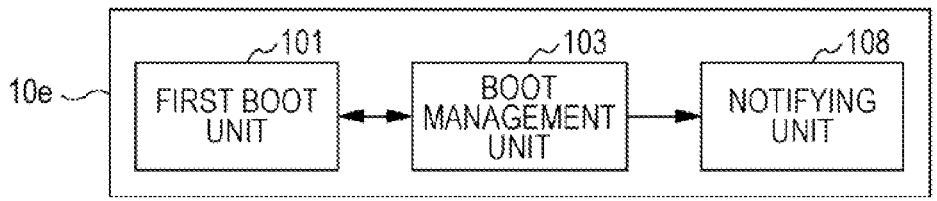

ELECTRONIC APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 front Japanese Patent Application No. 2014-119520 filed Jun. 10, 2014.

BACKGROUND

Technical Field

The present invention relates to electronic apparatuses, non-transitory computer readable media, and information processing methods.

SUMMARY

According to an aspect of the invention, there is provided an electronic apparatus including a first boot unit and a boot management unit. The first boot unit performs a first boot process for booting a first program. The boot management unit performs control of the first boot unit so as not to boot the first program in the first boot process next time when an interruption of the first boot process occurs and the interruption is caused by the first program being booted. The boot management unit does not perform the control when the interruption is caused by a factor other than the first program.

BRIEF DESCRIPTION OF THE DRAWINGS

Exemplary embodiments of the present invention will be described in detail based on the following figures, wherein:

FIG. 1 illustrates a hardware configuration of an electronic apparatus;

FIG. 2 illustrates a functional configuration of the electronic apparatus;

FIG. 3 illustrates an example of information having a boot setting table stored therein;

FIGS. 4A and 4B illustrate examples of a second boot status;

FIG. 9 illustrates a functional configuration of an electronic apparatus according to the second exemplary embodiment;

FIG. 10 illustrates a functional configuration of an electronic apparatus according to a third exemplary embodiment;

FIG. 11 illustrates an example of information stored in a boot setting table;

FIG. 12 illustrates a functional configuration of an electronic apparatus according to a fourth exemplary embodiment;

FIG. 13 illustrates an example of information stored in a boot setting table according to a modification;

FIGS. 14A and 14B illustrate an example of information stored in a boot setting table according to a modification; and FIG. 15 illustrates a functional configuration of an electronic apparatus according to a modification.

DETAILED DESCRIPTION

1. First Exemplary Embodiment

1.1. Configuration

Figure 5:
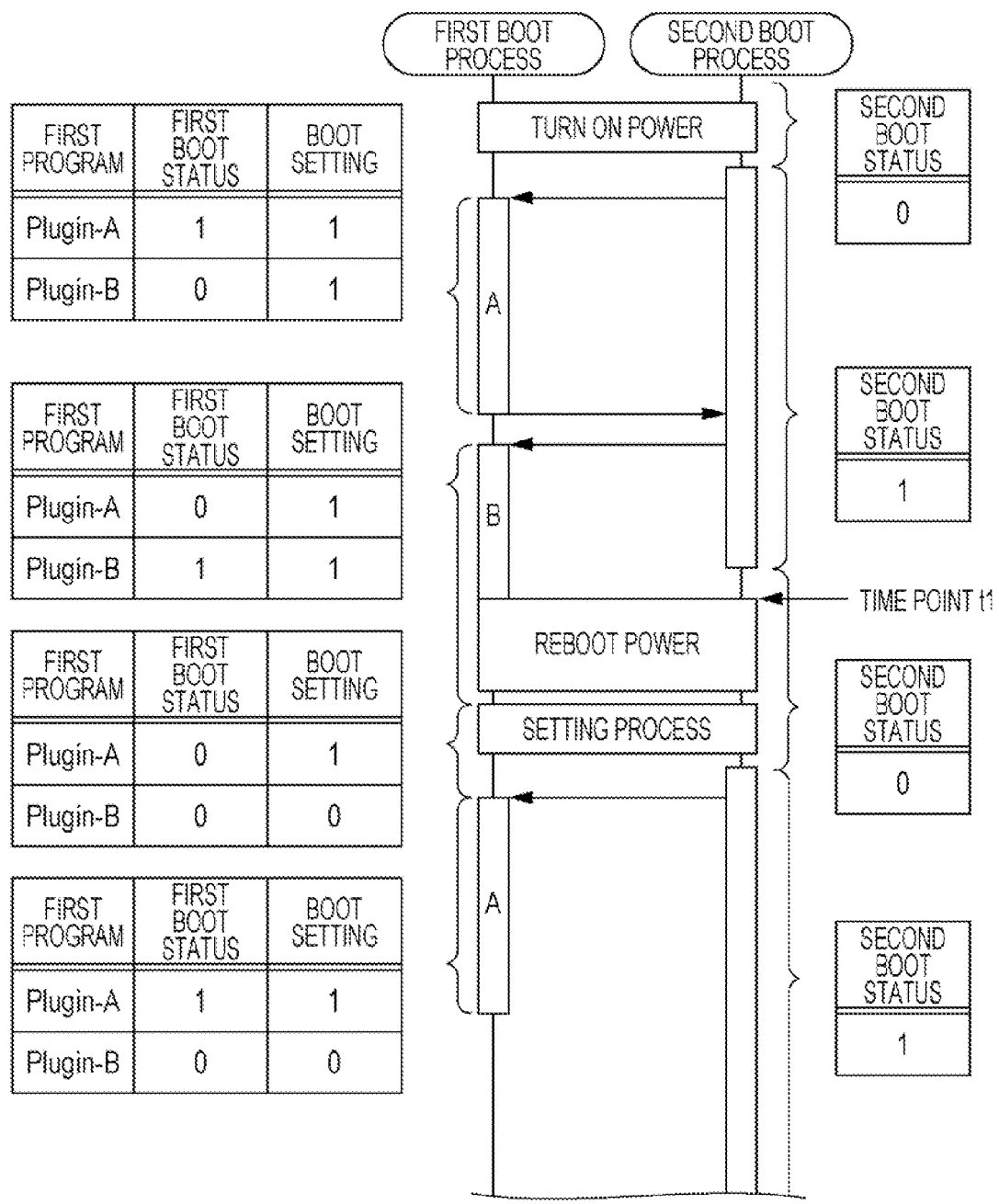
FIG. 5 illustrates an example of transition of first and second boot statuses.

FIG. 1 illustrates a hardware configuration of an electronic apparatus 10. The electronic apparatus 10 has, for example, an electronic circuit and performs operation such as processing image information, audio information, numerical-value information, and so on and inputting and outputting these pieces of information. The electronic apparatus 10 has multiple programs installed therein and executes these programs so as to achieve various kinds of functions. These programs include a program called firmware for achieving a primal function and a program called a plug-in for adding or expanding a function.

The electronic apparatus 10 is a computer having a controller 11, a storage unit 12, a communication unit 13, an operable unit 14, and a display unit 15. The controller 11 has, for example, a central processing unit (CPU), a random access memory (RAM), and a nonvolatile memory. The controller 11 causes the CPU to execute a program stored in the nonvolatile memory so as to control the operation of each unit. The storage unit 12 has a nonvolatile storage area and stores various kinds of programs, including the firmware and the plug-in mentioned above, and data in the storage area. The communication unit 13 communicates with an external device. The operable unit 14 receives user's operation performed on the electronic apparatus 10. The display unit 15 includes a display device that displays, for example, information to be used for operation.

The CPU in the controller 11 executes the programs stored in the storage unit 12 so that functions shown in FIG. 2 are achieved.

FIG. 2 illustrates a functional configuration of the electronic apparatus 10. The electronic apparatus 10 includes a first boot unit 101, a second boot unit 102, and a boot management unit 103.

The first boot unit 101 performs a first boot process for booting a first program. The second boot unit 102 performs a second boot process for booting a second program concurrently with the first boot process. In the first exemplary embodiment, the first boot unit 101 boots the aforementioned plug-in as the first program, and the second boot unit 102 boots the aforementioned firmware as the second program. The electronic apparatus 10 has multiple plug-ins installed therein. Therefore, the first boot unit 101 sequentially performs first boot processes for these multiple plug-ins (i.e., multiple first programs). In this specification, the term "boot" refers to a process in which a program is expanded on a memory and becomes usable.

The boot management unit 103 controls the first boot unit 101 so as not to boot a first program. When the boot management unit 103 executes this control, the first boot unit 101 stops the booting of the first program thereafter. This control will foe referred to as "boot stop control" hereinafter. When a first boot process is interrupted, if the interruption has occurred due to a first program being booted during the interruption, the boot management unit 103 subsequently executes boot stop control on this first program. If the interruption has occurred due to another factor, the boot management unit 103 does not execute boot stop control on this first program.

In the first exemplary embodiment, the boot management unit 103 executes boot stop control on the first program being booted if the second boot process is completed at the time of the interruption of the first boot process, and does not execute boot stop control if the second boot process is not completed. In order to determine whether or not to execute boot stop control on the first program, the boot management unit 103 uses information set to indicate whether or not to boot the first program (referred to as "boot setting" hereinafter). The boot, management, unit 103 stores a boot setting table, in which information about a boot setting and the like is stored, into the nonvolatile storage area in, for example, the storage unit 12.

FIG. 3 illustrates an example of information having the boot setting table stored therein. In the boot setting table, a first program, a first boot status, and a boot setting are stored in correspondence with one another. The first program includes program names of two plug-ins, that is, "plug-in-A" and "plug-in-B". In place of a program name, a first program itself may be stored, or a path or a file-name may be stored. In other words, information with which a first program is identifiable may be stored.

A first boot status indicates whether or not a first program corresponding thereto is currently being booted. A first boot status is indicated by "1" when a first program is in a booting status and by "0" when a first program is in a non-booting status. In this example, "plug-in-A" is set to "1 (booting)", and plug-in-B" is set to "0 (non-booting)". These first boot statuses are updated by, for example, the first boot unit 101. As mentioned above, the first boot unit 101 sequentially boots multiple first programs. In the first exemplary embodiment, the first boot unit 101 boots these first programs in accordance with the arranged order thereof in the boot setting table (i.e., from top to bottom in the example shown in FIG. 3).

When the first boot unit 101 starts a first boot process of a first program, the first boot unit 101 updates the corresponding first boot status to "1 (booting)". Then, the first boot unit 101 updates the first boot status to "0 (non-booting)" when the first boot process is completed. The first boot unit 101 repeats this first-boot-status updating process until there are no first programs remaining. The first-boot-status updating process may be performed by, for example, the boot management unit 103 upon reception of a notification from the first boot unit 101.

A boot setting is indicated by "1" when a first program is to be booted and by "0" when a first program is not to be booted (i.e., when booting is to be stopped). The boot management unit 103 does not execute boot stop control on a first program corresponding to "1 (boot)" and executes boot stop control on a first program corresponding to "0 (stop)". When a first program is stored into the boot setting table for the first time, "1 (boot)" is stored as a boot setting and is subsequently changed to "0 (stop)" where appropriate. This changing process will be described in detail later.

In addition to the above-described first boot statuses, the boot management unit 103 stores a second boot status, which indicates the boot status of the second program (i.e., firmware in the first exemplary embodiment), into the nonvolatile storage area in, for example, the storage unit 12.

FIGS. 4A and 4B illustrate examples of the second boot status. In FIG. 4A, the second boot status is set to "1 (booting)". In FIG. 4B, the second boot status is sot to "0 (non-booting)". This second boot status is updated by, for example, the second boot unit 102. In that case, when the second boot unit 102 starts the second boot process, the second boot unit 102 updates the second boot status to "1 (booting)". Then, the second boot unit 102 updates the second boot status to "0 (non-booting)" when the second boot process is completed. The second-boot-status updating process may be performed by, for example, the boot management unit 103 upon reception of a notification from the second boot unit 102.

FIG. 5 illustrates an example of transition of the first and second boot statuses. In FIG. 5, time elapses from top to bottom, and periods in which the first and second boot processes are performed are indicated by rectangles with solid lines. The second boot status is set to "0" prior to start of the second boot process. The second boot status becomes "1" when the power is turned on and the second boot process starts, and becomes "0" when the second boot process is completed. The first boot processes for "plug-in-A" and "plug-in-B" (both of which are set to "1" for the boot settings) are performed concurrently with this second boot process. When the first boot process for each first program is being performed, the corresponding first boot status is set to "1".

In the example shown in FIG. 5, at a time point t1 after the second boot process is completed, the first boot process for "plug-in-B" is interrupted and the power is rebooted. In this case, since the second boot process is already completed, it is conceivable that the interruption is caused by the first boot process. For example, if setting information used for booting "plug-in-B" is defective or the set values are abnormal, it may be difficult to proceed with the first boot process any further, thus making it difficult to complete the first boot process. Therefore, for example, the first boot unit 101 performs a power rebooting process. This power rebooting process may be performed by another unit, such as the second boot unit 102, in response to a request from the first boot unit 101.

When such a power rebooting process is performed, since the first boot process is not completed, the first boot unit 101 does not update the first boot status, so that the first boot status of "plug-in-B" remains at "1" even after the power is turned off. Subsequently, when the power is completely rebooted, the boot management unit 103 refers to the stored first and second boot statuses. In this case, the first and second boot statuses are the statuses at the time of the interruption of the first boot process (i.e., the first boot status is "1" and the second boot status is "0").

If the first boot status is "0" and the second boot status is "0", since the first and second boot processes are both completed, the boot management unit 103 does not change the boot setting of the first program. In the example shown in FIG. 5, this corresponds to "plug-in-A", the boot setting for which has not been changed from "1". When the first boot status is "1" and the second boot status is "0", since the first boot process is interrupted after completion of the second boot process, the boot management unit 103 determines that the interruption is caused by the first program and performs a process for changing the boot setting corresponding to that first boot status from "1 (boot)" to "0 (stop)".

A process related to this boot setting (including a case where the boot setting is not to be changed) will be referred to as "setting process" hereinafter. The above example corresponds to "plug-in-B", the boot setting for which has been changed from "1 (boot)" to "0 (stop)". Furthermore, the boot management unit 103 changes the first boot status from "1 (booting)" to "0 (non-booting)". Subsequently, the first boot process for "plug-in-A" with the boot setting of "1"

is performed, whereas the first boot process for "plug-in-B" with the boot setting changed to "0" is not performed.

Figure 6:
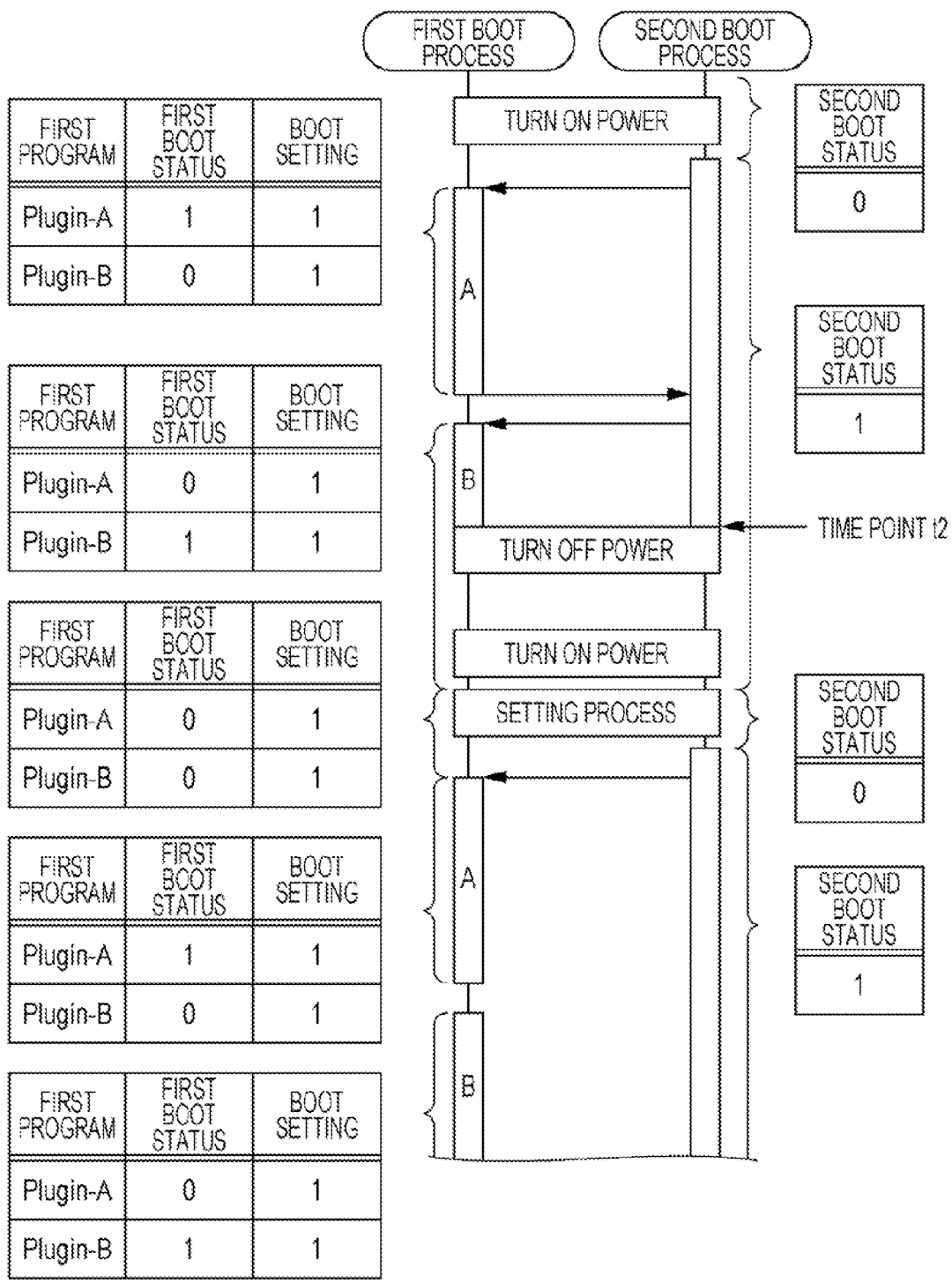
FIG. 6 illustrates another example of transition of the first and second boot statuses.

FIG. 6 illustrates another example of transition of the first and second boot statuses. The example shown in FIG. 6 is different from the example shown in FIG. 5 in that, at a time point t2 prior to completion of the second boot process, the second boot process and the first boot process for "plug-in-B" are interrupted and the power is rebooted. In this case, since the second boot process is also interrupted, the interruption may be not necessarily caused by the first boot process and may conceivably be caused by the second boot process or other factors (such as a user performing operation for turning off the power). In the example shown in FIG. 6, the first boot status of "plug-in-B" as well as the second boot status remain at "1" after the power is turned off at the time point t2.

When the first boot status is "1" and the second boot status is "1", since the interruption may be not necessarily caused by the first boot process, the boot management unit 103 does not change the boot setting of the first program. In the example shown in FIG. 6, this corresponds to "plug-in-B", the boot setting for which has not been changed from "1". Accordingly, unlike the example shown in FIG. 5, the first boot processes for "plug-in-A" and "plug-in-B", both with boot settings of "1", are performed.

In the examples shown in FIGS. 5 and 6, the setting process is performed when the power is turned on again. Alternatively, the setting process may be performed when the power is being turned off. For example, since a so-called shutdown process is performed when the power is to be turned off, the setting process may be performed together with the shutdown process. Furthermore, in the examples shown in FIGS. 5 and 6, the setting process is performed prior to start of the first and second boot processes after the power is turned on again. Alternatively, for example, the setting process may be performed after the second boot process starts. As a further alternative, immediately before each first boot process starts, the setting process for the first program to be booted in that first boot process may be performed. In other words, the setting process for a first program may be performed before the first boot process for that first program is performed.

1.2. Operation

Figure 7:
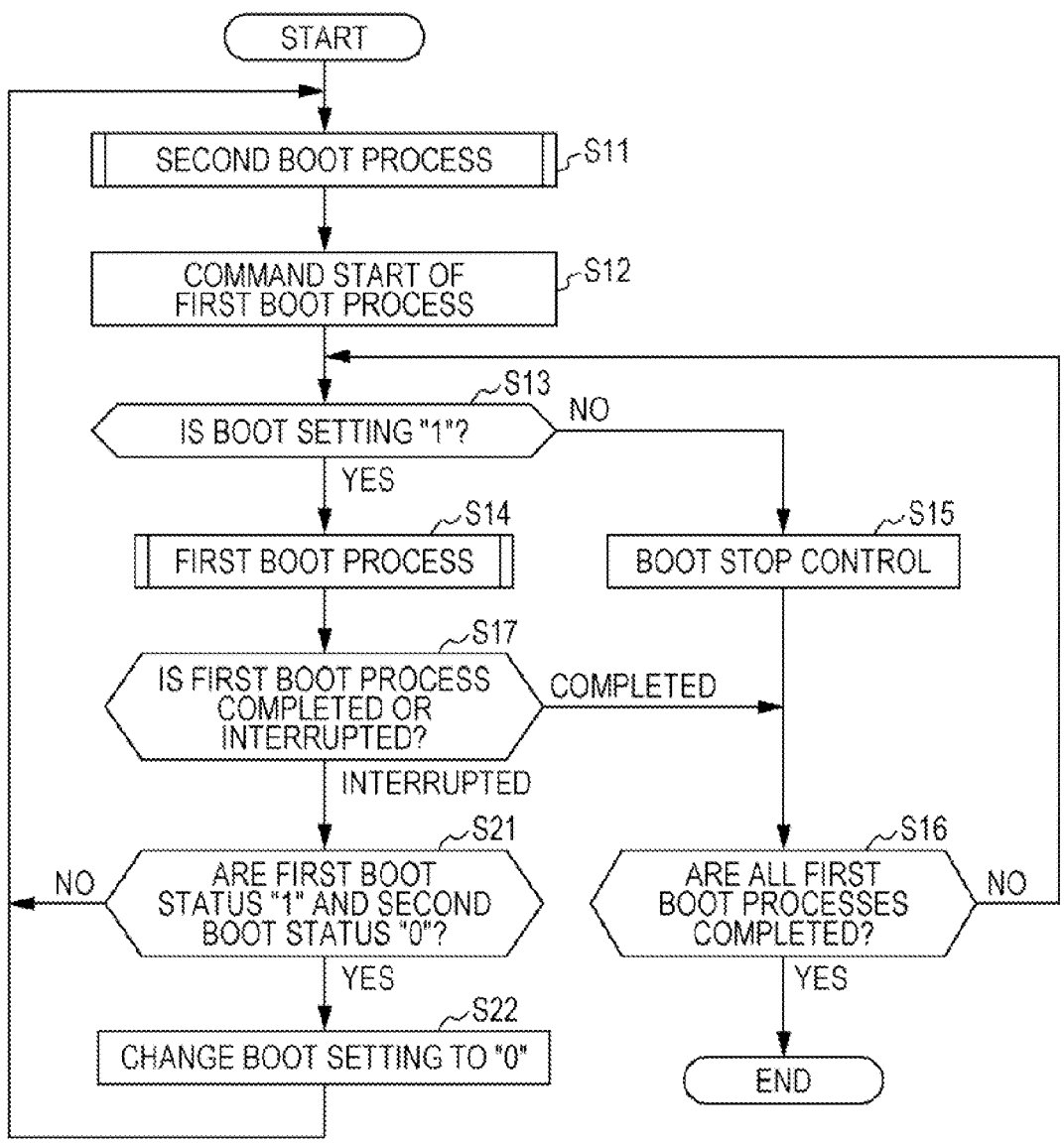
FIG. 7 is a flowchart related to a first boot process.

FIG. 7 is a flowchart related to a first boot process. In the first exemplary embodiment, a first boot process is performed when the power of the electronic apparatus 10 is turned on. First, in stop S11, the electronic apparatus 10 starts a second boot process (i.e., a process for booting firmware). In step S12, start of a first boot process in the second boot process is commanded. Steps S11 and S12 are performed by the second boot unit 102. Then, in step S13, the electronic apparatus 10 determines whether or not the boot setting for a first one of the first programs is "1 (boot)". If the determination result indicates "boot" (YES), the electronic apparatus 10 performs the first boot process for that first program in step S14.

If the electronic apparatus 10 determines that the boot setting is not "1" (NO, i.e., "0 (stop)") in step S13, the electronic apparatus 10 performs above-described boot stop control in step S15. After performing boot stop control, the electronic apparatus 10 determines in step S16 whether or not the first boot processes fox all first programs have been completed. If it is determined that ail first boot processes have been completed (YES), the first boot processes end. If the electronic apparatus 10 determines in step S16 that the first boot processes for ail first programs have not been completed (NO), the electronic apparatus 10 returns to step S13 to proceed with the operation. Steps 314 and S16 are performed by the first boot unit 101.

When the first boot process performed in step S14 is completed without interruption (COMPLETED in step S17), the electronic apparatus 10 performs step S16. If the first boot process is interrupted (INTERRUPTED in step S17), the electronic apparatus 10 undergoes a power off-and-on process and a power rebooting process and refers to the first boot status and the second boot status at the time of the interruption. If the first boot status is "1" and the second boot status is "0" (YES in step S21), the electronic apparatus 10 changes the boot setting of the first program corresponding to that first boot status to "0" in step S22. If both boot statuses are not in the aforementioned statuses (NO in step S21), the electronic apparatus 10 returns to step S13 and proceeds with the operation without changing the boot settings. Steps S13, S15, S21, and S22 are performed by the boot management unit 103.

Accordingly, in the first exemplary embodiment, when a first boot process is interrupted, if the interruption is caused by the first program being booted during the interruption, the first program is excluded from boot targets. Since this first program may possibly be interrupted again if it is rebooted, a situation where booting of a program is interrupted may be reduced. On the other hand, if the interruption is caused by a factor other than the first program, the first program is booted the next time and onward without being excluded from boot targets. Since there is no factor for the interruption in this first program, it is expected that the first boot process may be completed the next time.

Furthermore, in the first exemplary embodiment, if the second boot process is completed when the first boot process is interrupted, boot stop control is executed based on the assumption that the interruption is caused by the first program being booted. The fact that the second boot process is completed at the time of the interruption indicates that there is a low possibility that the interruption is caused by the second boot process, whereas there is a high possibility that the interruption is caused by the first boot process. In addition, there is also a high possibility that the interruption is caused by the first program booted in that first boot process. In the first exemplary embodiment, boot stop control is executed on the first program with a high possibility that it may be the factor for the interruption.

2. Second Exemplary Embodiment

A second exemplary embodiment of the present invention will be described below while focusing on points different from those in the first exemplary embodiment. In the first exemplary embodiment, boot stop control is executed based on the first and second boot statuses. In contrast, in the second exemplary embodiment, when a first boot process is interrupted, boot stop control is executed based on whether or not a time period (referred to as "first processing time period" hereinafter) taken from a time when the first boot process starts to a time when the first boot process is interrupted is larger than or equal to a threshold. The following description of the second exemplary embodiment relates to a case where the threshold is fixed and to a case where the threshold is variable.

2.1. Fixed Threshold

If the aforementioned first processing time period is larger than or equal to the threshold, the boot management unit 103 according to the second exemplary embodiment executes boot stop control on the first program being booted. If the first processing time period is smaller than the threshold, the boot management unit 103 does not execute boot stop control. The threshold is set for each first program. For example, the first boot process for each first program is performed multiple times, and an average value of the time taken from the start to the completion thereof or a value slightly larger than the average value (e.g., a value obtained by multiplying the average value by 1.1 or a value obtained by adding several seconds to the average value) is set as the threshold. For example, with regard to "plug-in-A" and "plug-in-B" shown in FIG. 3 and so on, the thresholds therefor are both set to 4.0 seconds. For example, the boot management unit 103 stores the time elapsed from the start of each first boot process by adding a column in the boot setting table shown in FIG. 3.

Figure 8:
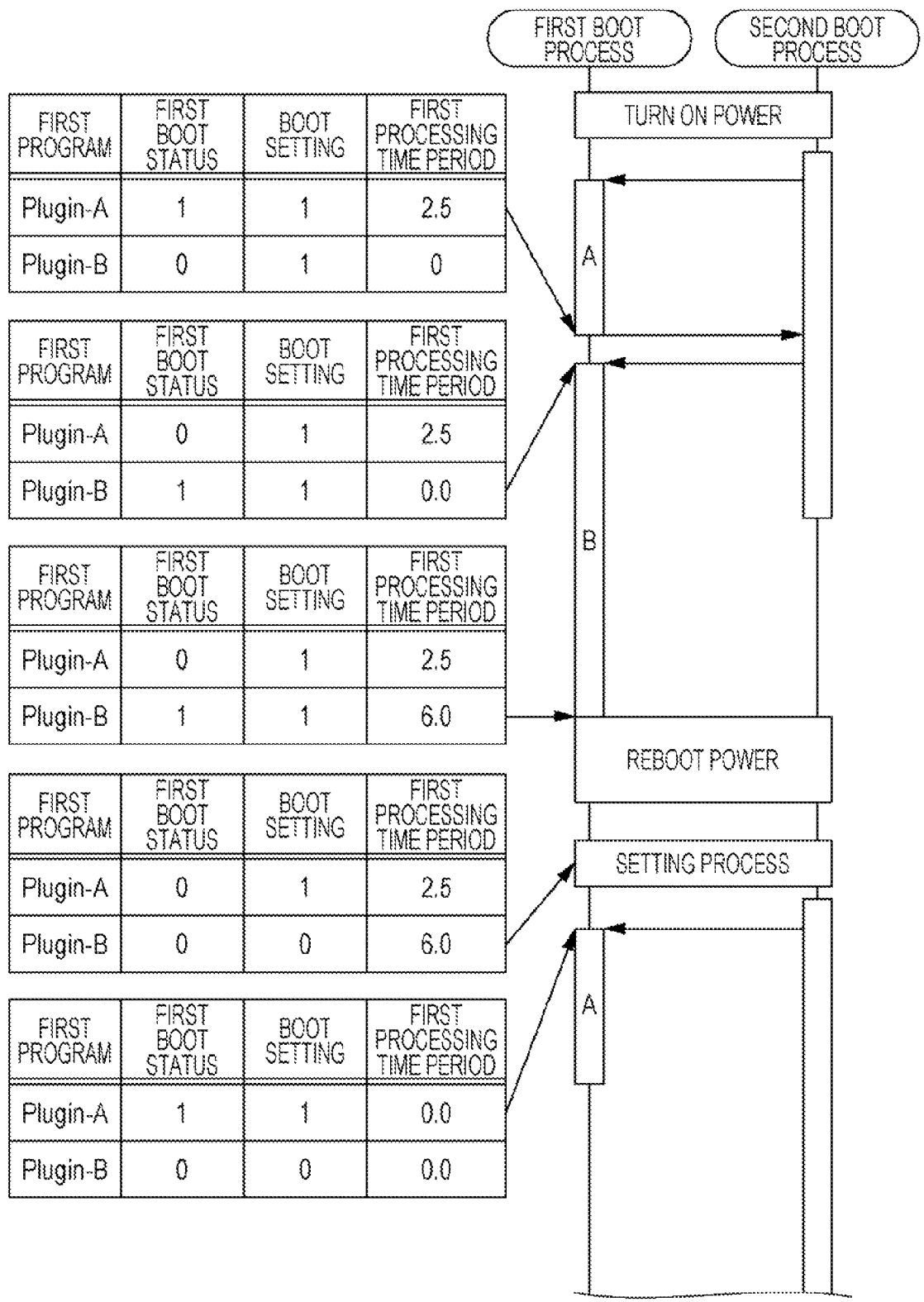
FIG. 8 illustrates an example of transition of a boot setting table according to a second exemplary embodiment.

FIG. 8 illustrates an example of transition of the boot setting table according to the second exemplary embodiment. In FIG. 8, the periods in which the first and second boot processes are performed are indicated as in the example shown in FIG. 5. For example, at the time when the first boot process for "plug-in-A" is completed, the boot management unit 103 stores 2.5 seconds as the corresponding first processing time period. Subsequently, even when the first boot process for "plug-in-B" starts, the first processing time period at the time of completion (in this case, 2.5 seconds) is continuously stored. In the example shown in FIG. 8, when 6.0 seconds elapse from the start of the first boot process for "plug-in-B", the power is rebooted. The first processing time period of 6.0 seconds in this case is also continuously stored until the power is completely rebooted.

In the setting process performed after the power is rebooted, the boot management unit 103 compares the first processing time period of "plug-in-B", which has undergone interruption in the first boot process, with the threshold (4.0 seconds mentioned above). Since the first processing time period is larger than or equal to the threshold, the boot management unit 103 changes the boot setting of "plug-in-B" from "1 (boot)" to "0 (stop)" in the setting process. Thus, the boot management unit 103 executes boot stop control on "plug-in-B". To prepare for the subsequent first boot process, the boot management unit 103 updates the first processing time period to 0.0 seconds. In the example shown in FIG. 8, if the threshold for "plug-in-B" is, for example, 8.0 seconds, the boot management unit 103 does not change the boot setting of "plug-in-B" and does not execute boot stop control since the first processing time period is smaller than the threshold.

The fact that the first processing time period is larger than or equal to the threshold indicates that there is a possibility of a certain kind of abnormality, such as loop or bottleneck queue, in the first boot process. In the second exemplary embodiment, since boot stop control is executed when the first processing time period is larger than or equal to the threshold, the first boot process is not repeated.

In the second exemplary embodiment, although the boot management unit 103 is configured to execute boot stop control when the first processing time period is larger than or equal to the threshold, and is configured not to execute boot stop control when the first processing time period is smaller than the threshold, only one of the two may be realized. For example, the boot management unit 103 may be configured to execute boot stop control when the first processing time period is larger than or equal to the threshold, and may be configured to determine whether or not to execute boot stop control based on another condition (such as the type of error to be described later) when the first processing time period is smaller than the threshold. Furthermore, the boot management unit 103 may be configured not to execute boot stop control when the first processing time period is smaller than the threshold, and may be configured to determine whether or not to execute boot stop control based on another condition when the first processing time period is larger than or equal to the threshold.

2.2. Variable Threshold

Next, a case where the threshold is variable will be described.

FIG. 9 illustrates a functional configuration of an electronic apparatus 10b according to the second exemplary embodiment. The electronic apparatus 10b includes a connection unit 104 and a setting acquisition unit 105. The connection unit 104 connects the electronic apparatus 10b to an external device. For example, the connection unit 104 performs communication in a wired or wireless manner and connects to a communication device, such as a hub, a switch, or a router. The setting acquisition unit 105 acquires setting information related to a boot time period of a first program from the connected external device. A boot time period in this case is a time period taken from the start to the completion of a first boot process.

In the second exemplary embodiment, the connection unit 104 connects to a communication device having a user authentication function, and the setting acquisition unit 105 acquires user-authentication setting information from the communication device. For example, user-authentication setting information indicates whether or not to encrypt data exchanged during user authentication. In this case, the time taken for user authentication is longer when performing encryption than when not performing encryption. When the setting acquisition unit 105 acquires the setting information, the setting acquisition unit 105 supplies the acquired setting information to the boot management unit 103.

The boot management unit 103 uses the aforementioned threshold in accordance with the setting information acquired by the setting acquisition unit 105. For example, when setting information indicating that data exchanged during user authentication is to be encrypted is acquired, the boot management unit 103 uses a first threshold (e.g., 10 or 20 seconds). When setting information indicating that data is not to be encrypted is acquired, the boot management unit 103 uses a second threshold (e.g., 3 or 5 seconds) smaller than the first threshold. In the second exemplary embodiment, the threshold is varied in this manner.

The setting information is not limited to that described above. For example, when a session with the external device via the communication device is established in a first boot process, setting information indicating whether or not the communication device is to perform destination control (i.e., control for performing forwarding only to a designated destination) or setting information indicating whether or not to perform flow control (i.e., control for stopping transmission or limiting the communication speed when buffer exhaustion occurs) may be used. If the time taken until the session with the external device is established is affected by executing or not executing these kinds of control, the boot management unit 103 may increase the threshold when the acquired setting information indicates that the time be extended is acquired, or may reduce the threshold when the acquired setting information indicates that the time be shortened.

3. Third Exemplary Embodiment

A third exemplary embodiment of the present invention will be described below while focusing on points different from those in the first and second exemplary embodiments. In the third exemplary embodiment, it is determined whether or not to execute boot stop control based on the type of error occurring when a first boot process is interrupted.

FIG. 10 illustrates a functional configuration of an electronic apparatus 10c according to the third exemplary embodiment. In addition to the first boot unit 101 and the boot management unit 103 shown in FIG. 2, the electronic apparatus 10c includes an error acquisition unit 106.

When a first boot process is interrupted, the error acquisition unit 106 acquires error information in accordance with the factor for the interruption. The error information is classified into two types. The first type indicates an error caused by a first program and is, for example, information indicating that setting information used for booting the first program is defective or does not indicate a normal value. When such an error occurs, the same error may occur even upon rebooting unless a measure for removing the factor therefor is taken, such as renewing the setting information. Such information will be referred to as "fatal error information" hereinafter.

The second type is information indicating an error not caused by a first program and is, for example, information indicating that the memory is insufficient or that a designated external device is not connected. The second type may also include error information indicating that, for example, an internet protocol (IP) address is not confirmed or a host name is not determined when performing communication. When such an error occurs, the same error may sometimes not occur upon rebooting without performing a specific measure, depending on the operational state of other devices or a program. Such information will be referred to as "non-fatal error information" hereinafter. When the error acquisition unit 106 acquires the error information, the error acquisition unit 106 supplies the acquired error information to the boot management unit 103.

In the third exemplary embodiment, when one of the predetermined types of error information is acquired by the error acquisition unit 106, the boot management unit 103 executes boot stop control. When error information other than the predetermined types of error information is acquired by the error acquisition unit 106, the boot management unit 103 does not execute boot stop control. The boot management unit 103 stores the error information supplied from the error acquisition unit 106 by, for example, adding a column in the boot setting table shown in FIG. 3.

FIG. 11 illustrates an example of information stored in the boot setting table. In the example in FIG. 11, three first programs, that is, "plug-in-A", "plug-in-B", and "plug-in-C", are stored in correspondence with respective types of error information, that is, "null", "non-fatal error information", and "fatal error information". When "fatal error information" is stored as the error information, the boot management unit 103 changes the boot setting of the corresponding first program from "1 (boot)" to "0 (stop)". In the example in FIG. 11, the boot management unit 103 changes the boot setting of "plug-in-C" with "fatal error information" stored therein to "0 (stop)" so as to set this first program as a target for boot stop control.

In a case where non-fatal error information is acquired when a first boot process is interrupted, if the first program that has undergone interrupted booting is rebooted, the booting may sometimes be completed without interruption this time due to, for example, an increase in available space in the memory from, the previous booting. In the third exemplary embodiment, boot stop control is not executed on a first program that may possibly be completely booted in this manner.

In the third exemplary embodiment, although the boot management unit 103 is configured to execute boot stop control when one of the predetermined types of error information is acquired, and is configured not to execute boot stop control when error information other than the predetermined types of error information is acquired, only one of the two may be realized. For example, the boot management unit 103 may foe configured to execute boot stop control when one of the predetermined types of error information is acquired, and may be configured to determine whether or not to execute boot stop control based on another condition (such as the first processing time period described above) when error information other than the predetermined types of error information is acquired. Furthermore, the boot management unit 103 may foe configured not to execute boot stop control when error information other than the predetermined types of error information is acquired, and may be configured to execute boot stop control based on another condition when one of the predetermined types of error information is acquired.

4. Fourth Exemplary Embodiment

A fourth exemplary embodiment of the present invention will be described below while focusing on points different from those in the above exemplary embodiments. In the fourth exemplary embodiment, it is determined whether or not to execute boot stop control based on whether or not the electronic apparatus 10 is rebooted due to a factor different from a first boot process. Three types of factors will be described below.

4.1. Second Boot Process

The second boot process may sometimes be the factor for the power rebooting mentioned above. For example, the second boot unit 102 shown in FIG. 2 may sometimes perform the power rebooting process for, for example, reflecting a changed parameter during the second boot process. In that case, the second boot unit 102 generates a command for rebooting the power. For example, the second boot unit 102 supplies the generated command to the boot management unit 103 so as to notify the boot management unit 103 that the power has been rebooted. Since a first boot process is interrupted when the power rebooting process is performed in this manner, this notification is performed immediately before or after the interruption of the first boot process.

When the boot management unit 103 receives the aforementioned notification, that is, when the first boot process is interrupted due to the power rebooting process performed in the second boot process, boot stop control is not executed on the first program being booted during the interruption, whereas boot stop control is executed if the interruption is caused due to another factor. If the power rebooting is caused by the second boot process, since there is no problem in the actual booting of the first program even if the first boot process is interrupted, there is a high possibility that the first boot process may be completed when performed again.

4.2. External Device

In the case where the electronic apparatus includes the connection unit 104 shown in FIG. 9 in addition to the units shown in FIG. 2, an external device connected by the connection unit 104 may be the factor for power rebooting. When the power of the electronic apparatus connected to the external device is turned on, for example, a process for establishing connection with this external device is performed.

In this case, the external device may sometimes request the electronic apparatus to reboot the power for, for example, reflecting a changed parameter, as in the second boot process. Specifically, request data indicating this request is transmitted from the external device to the electronic apparatus. When the electronic apparatus receives this request data, the electronic apparatus reboots the power. This power rebooting process may foe performed by the first boot unit 101 or the second boot unit 102, or may be performed by another unit. Any of these units sends a notification to the boot management unit 103 when the power rebooting process is performed based on the request data from the external device.

When a first boot process is interrupted due to the power rebooting process performed based on the request from the external device connected by the connection unit 104, the boot management, unit 103 does not execute boot stop control on the first program being booted during the interruption, but executes boot stop control if the interruption is caused due to another factor.

4.3. Set Value

A set value used in the electronic apparatus may sometimes be the factor for power rebooting.

FIG. 12 illustrates a functional configuration of an electronic apparatus 10d according to the fourth exemplary embodiment. The electronic apparatus 10d includes a processing unit 107 in addition to the first boot unit 101 and the boot management unit 103 shown in FIG. 2 and the connection unit 104 shown in FIG. 9. The processing unit 107 performs a process based on a setting. For example, the processing unit 107 performs a process based on the setting of an authentication method, which includes authentication based on stored data (referred to as "device authentication" hereinafter) and authentication based on an inquiry made to, for example, a certificate authority (referred to as "external authentication" hereinafter). When changing the setting of the authentication method, the electronic apparatus 10d reboots the power for reflecting the change.

If there are multiple types of external devices connected to the connection unit 104, the corresponding authentication method may vary among the multiple types of external devices. For example, a first external device complies with device authentication, whereas a second external device complies with external authentication. In a case where the electronic apparatus 10d is connected to the first external device and is set to perform device authentication, it is assumed, that the first external device is disconnected and the second external device is connected. In that case, since the electronic apparatus 10d is set to perform an authentication method (i.e., device authentication) with which the second external device does not comply, the electronic apparatus 10d changes the setting of the authentication method to an authentication method (i.e., external authentication) with which the second external device complies. In this case, the electronic apparatus 10d reboots the power, as described above. Therefore, when the setting is changed while a first boot process is being performed, the first boot process is interrupted by power rebooting.

When the first boot process is interrupted by power rebooting due to the change in the setting in this manner, the boot management unit 103 does not execute boot stop control on the first program being booted during the interruption, but executes boot stop control if the interruption is caused due to another factor. Power rebooting is performed not only when the setting is changed hot also when the setting is outside a predetermined range.

For example, if an authentication method with which the electronic apparatus 10d does not comply is set by mistake and there are no connected external devices that are to use authentication, the electronic apparatus 10d disables the setting without changing the setting and reflects the disabled setting by rebooting the power. If a first boot process is interrupted by power rebooting due to the setting being outside the predetermined range in this manner, the boot management unit 103 may perform the above-described operation.

5. Modifications

The above-described exemplary embodiments are only examples of exemplary embodiments of the present invention and may be modified as follows. Furthermore, the above-described exemplary embodiments and the following modifications may be combined, where appropriate.

5.1. Number of Interruptions

The determination of whether or not to execute boot stop control may be performed based on the number of times a first boot process is interrupted. In this case, if the number of times a first program is interrupted during booting thereof is larger than or equal to a threshold, the boot management unit 103 executes boot stop control on that first program. For example, the boot management unit 103 stores the number of times a first boot process is interrupted for each first program by adding a column in the boot setting table shown in FIG. 3.

FIG. 13 illustrates an example of information stored in a boot setting table according to a modification. In the example shown in FIG. 13, the numbers of interruptions, that is, "0", "1", and "4", are stored in correspondence with respective first programs, that is, "plug-in-A", "plug-in-B", and "plug-in-C". In this example, the threshold for the number of interruptions is three. The boot management unit 103 changes the boot setting of "plug-in-C", in which the number of interruptions (four times) is larger than or equal to the threshold, to "0 (stop)" and does not execute boot stop control on this first program.

For example, when an error indicated by non-fatal error information described above occurs, although an interruption may not necessarily occur in the subsequent first boot process, an interruption may occur frequently depending on the contents of the error. In this modification, boot stop control is executed on such a first program that is frequently interrupted.

The threshold in this modification may vary among the first programs. For example, the threshold for a preferential first program or a frequently-used first program may be set to a larger value. Thus, these first programs are booted more frequently than other first programs.

5.2. Changing of Sequence

In each of the above exemplary embodiments, the first boot unit 101 performs multiple first boot processes for sequentially booting multiple first programs. In this case, instead of controlling the first boot unit 101 so as not to boot a first program in a first boot process, the boot management unit 103 may control the first boot unit 101 so as to change the sequence in which the first programs are booted. For example, the boot management unit 103 stores values indicating a first-boot-process-performing sequence (referred to as "boot sequence" hereinafter) by adding a column in the boot setting table shown in FIG. 3.

FIGS. 14A and 14B illustrate an example of information stored in a boot setting table according to a modification. In FIG. 14A, boot sequence values, that is, "1", "2", and "3", are stored in correspondence with respective first programs, that is, "plug-in-A", "plug-in-B", and "plug-in-C". For example, when "plug-in-B" is interrupted, the boot management unit 103 changes the boot sequence value of "plug-in-B" to "1" and changes the boot sequence value of "plug-in-A" from "1" to "2". The first boot unit 101 sequentially performs the first boot processes starting from the first program with the smallest boot sequence value.

In the example shown in FIGS. 14A and 14B, the boot management unit 103 performs the changing process such that a first program that has undergone interrupted booting is set to be first in the boot sequence. Alternatively, the boot management unit 103 may perform the changing process such that the first program that has undergone interrupted booting is set to be last in the boot sequence or immediately before or after a specific first program. For example, in a case of a first program in which communication is to be performed in the first boot process therefor, since there is a high possibility that a communicable state is established later in the boot sequence, the first boot process therefor is more likely to be completed when performed later in the boot sequence. The first boot processes are more likely to be completed by changing the boot sequence in this manner.

In the case where the electronic apparatus includes the error acquisition unit 106 shown in FIG. 10, the boot management unit 103 may change the boot sequence in accordance with acquired error information. For example, when error information related to communication is acquired, since such an error may dissolve with time, as mentioned above, the boot sequence value is changed toward the later side. If an interruption occurs even with the changed boot sequence, the boot management unit 103 may change the boot sequence to another boot sequence excluding the boot sequence used at the time of the previous interruption of the first boot process. In this case, as the changing process is repeated, the first programs are booted in a boot sequence in which the first boot processes are less likely to be interrupted.

5.3. Notification of Boot Setting

The electronic apparatus may include a notifying unit that notifies a user of a change in boot setting.

FIG. 15 illustrates a functional configuration of an electronic apparatus 10e according to a modification. The electronic apparatus 10e includes a notifying unit 108 in addition to the first boot unit 101 and the boot management unit 103 shown in FIG. 2. When a boot setting is changed, the notifying unit 108 notifies the user of the changed boot setting. The notifying unit 108 stores, for example, user's destination (such as an electronic mail address or a social-networking-service (SNS) account) and transmits the boot setting to that destination. Alternatively, the notifying unit 108 may display the boot setting on the display unit 15 of the electronic apparatus 10e. In addition to the changed boot setting, the notifying unit 108 may notify the user of boot statuses (i.e., the first and second boot statuses) or may notify the user that the booting has been completed.

5.4. Categories of Exemplary Embodiments of Present Invention

An exemplary embodiment of the present invention may also be regarded as an information processing method for realizing the process performed by the above-described electronic apparatus. Furthermore, an exemplary embodiment of the present invention may also be regarded as a program for causing a computer, which controls the electronic apparatus, to function as the above-described units. For example, this program is provided by being stored in a storage medium, such as an optical disk, or is made usable by being downloaded and installed info the computer via a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic apparatus comprising:
one or more processors programmed to
perform a first boot process for booting a first program,
perform a second boot process for booting a second program concurrently with the first boot process, and
perform control so as not to boot the first program in the first boot process next time when an interruption of the first boot process occurs and the interruption is caused by the first program being booted, and not to perform the control when the interruption is caused by a factor other than the first program, wherein
the one or more processors perform the control for the first program being booted if the second boot process is completed during the interruption, and do not perform the control if the second boot process is not completed during the interruption.

2. The electronic apparatus according to claim 1, wherein when the first boot process is interrupted, if a time period taken from a time when the first boot process starts to a time when the interruption occurs is larger than or equal to a threshold, the one or more processors perform the control for the first program being booted during the interruption.

3. The electronic apparatus according to claim 1, wherein when the first boot process is interrupted, if a time period taken from a time when the first boot process starts to a time when the interruption occurs is smaller than a threshold, the one or more processors do not perform the control for the first program being booted during the interruption.

4. The electronic apparatus according to claim 2, wherein the one or more processors are connected to an external device, and
the one or more processors acquire, from the connected external device, setting information related to a time period taken from when the first boot process starts to when the first boot process is completed, wherein the one or more processors use the threshold in accordance with the acquired setting information.

5. The electronic apparatus according to claim 1, wherein if the number of interruptions occurring during booting of the first program is larger than or equal to a threshold, the one or more processors perform the control for the first program.

6. The electronic apparatus according to claim 1, wherein the one or more processors acquire error information in accordance with a factor for the interruption when the interruption occurs, and the one or more processors perform the control if at least one of the acquired error information is included in predetermined types.

7. The electronic apparatus according to claim 1, wherein the one or more processors acquire error information in accordance with a factor for the interruption when the interruption occurs, and the one or more processors do not perform the control if at least one of the acquired error information is of a type other than predetermined types.

8. The electronic apparatus according to claim 1, wherein the one or more processors do not perform the control for the first program being booted during the interruption if the interruption is caused by rebooting performed in the second boot process.

9. The electronic apparatus according to claim 1, wherein the one or more processors are connected to an external device, and the one or more processors do not perform the control for the first program being booted during the interruption if the interruption is caused by rebooting based on a request from the connected external device.

10. The electronic apparatus according to claim 1, wherein the one or more processors perform a process based on a setting, and the one or more processors do not perform the control for the first program being booted during the interruption if the interruption is caused by rebooting due to the setting being outside a predetermined range or due to a change in the setting.

11. The electronic apparatus according to claim 1, wherein the one or more processors perform a plurality of the first boot processes for sequentially booting a plurality of the first programs, and the one or more processors perform control so as to change a sequence in which the first programs are booted, instead of controlling as not to boot the first programs in the first boot processes.

12. A non-transitory computer readable medium storing a program causing a computer to execute a process for processing information, the process comprising:

performing a first boot process for booting a first program;

performing a second boot process for booting a second program concurrently with the first boot process; and performing control so as not to boot the first program in the first boot process next time when an interruption of the first boot process occurs and the interruption is caused by the first program being booted, or not performing the control when the interruption is caused by a factor other than the first program, wherein the control for the first program being booted is performed if the second boot process is completed during the interruption, and is not performed if the second boot process is not completed during the interruption.

13. An information processing method comprising:

performing a first boot process for booting a first program;

performing a second boot process for booting a second program concurrently with the first boot process; and performing control so as not to boot the first program in the first boot process next time when an interruption of the first boot process occurs and the interruption is caused by the first program being booted, or not performing the control when the interruption is caused by a factor other than the first program, wherein the control for the first program being booted is performed if the second boot process is completed during the interruption, and is not performed if the second boot process is not completed during the interruption.

* * * * *